US008930318B1

(12) United States Patent
Petkov et al.

(10) Patent No.: US 8,930,318 B1
(45) Date of Patent: Jan. 6, 2015

(54) SYSTEMS AND METHODS FOR HANDLING INTERRUPTIONS WHILE UPDATING OF AN ELECTRONIC DEVICE

(75) Inventors: Darin S. Petkov, Zürich (CH); Andrew De Los Reyes, Belmont, CA (US)

(73) Assignee: Google Inc., Mountain View, CA (US)

( * ) Notice: Subject to any disclaimer, the term of this patent is extended or adjusted under 35 U.S.C. 154(b) by 30 days.

(21) Appl. No.: 13/249,147

(22) Filed: Sep. 29, 2011

(51) Int. Cl.
*G06F 17/30* (2006.01)
*G06F 11/14* (2006.01)

(52) U.S. Cl.
CPC .................. *G06F 11/1407* (2013.01)
USPC .......................................... 707/649

(58) Field of Classification Search
CPC .................................. G06F 11/1407
USPC .......................................... 707/649
See application file for complete search history.

(56) References Cited

U.S. PATENT DOCUMENTS

| | | | |
|---|---|---|---|
| 4,912,707 A * | 3/1990 | Kogge et al. ............... 714/17 |
| 5,317,752 A * | 5/1994 | Jewett et al. ............... 714/14 |
| 6,622,263 B1 * | 9/2003 | Stiffler et al. ............. 714/13 |
| 8,171,227 B1 * | 5/2012 | Goldschmidt et al. ..... 711/136 |
| 8,380,621 B1 * | 2/2013 | Bent et al. ................ 705/39 |
| 2004/0153672 A1 * | 8/2004 | Watt et al. ................ 713/201 |
| 2006/0031205 A1 * | 2/2006 | Perkins et al. ............. 707/3 |
| 2006/0184587 A1 * | 8/2006 | Federwisch et al. ....... 707/200 |
| 2012/0151272 A1 * | 6/2012 | Behrendt et al. .......... 714/39 |
| 2012/0331471 A1 * | 12/2012 | Ramalingam et al. ..... 718/102 |

* cited by examiner

*Primary Examiner* — Apu Mofiz
*Assistant Examiner* — Dara J Glasser
(74) *Attorney, Agent, or Firm* — McDermott Will & Emery LLP (57) ABSTRACT

Systems and methods for safeguarding against interruptions when updating data of an electronic device are provided. In some aspects, a method includes applying a current operation of a plurality of operations to the data. The plurality of operations is associated with a current update for the data. The method also includes generating current a current version of a checkpoint if the applying step has completed. The current version of the checkpoint comprises a next operation indicator that specifies a next operation of the plurality of operations to be applied to the data. The method also includes storing the current version of the checkpoint on the electronic device such that the current version of the checkpoint persists across reboot of the electronic device.

21 Claims, 3 Drawing Sheets

SYSTEMS AND METHODS FOR HANDLING INTERRUPTIONS WHILE UPDATING OF AN ELECTRONIC DEVICE

FIELD

The subject technology generally relates to data updates and, in particular, relates to systems and methods for handling interruptions while updating data of an electronic device.

BACKGROUND

An update to an operating system (OS) may typically be applied after the entire update has been downloaded. However, it may be desirable to apply individual operations of the update as the individual operations are downloaded, rather than to wait until the entire update has been downloaded. For example, a particular update for the OS may comprise a plurality of operations to be applied to the OS. Each operation may be downloaded and immediately applied before a next operation is downloaded. However, if an interruption occurs during this update process, then a challenge lies in determining how to resume the update process.

SUMMARY

According to various aspects of the subject technology, a computer-implemented method for safeguarding against interruptions when updating data of an electronic device is provided. The method comprises applying a current operation of a plurality of operations to the data. The plurality of operations is associated with a current update for the data. The method also comprises generating a current version of a checkpoint if the applying step has completed. The current version of the checkpoint comprises a next operation indicator that specifies a next operation of the plurality of operations to be applied to the data. The method also comprises storing the current version of the checkpoint on the electronic device such that the current version of the checkpoint persists across reboot of the electronic device.

According to various aspects of the subject technology, a system for safeguarding against interruptions when updating data of an electronic device is provided. The system comprises an auto-update module configured to apply a current operation of a plurality of operations to the data. The plurality of operations is associated with a current update for the data. The system also comprises a checkpoint module configured to generate a current version of the checkpoint if the application of the current operation to the data has completed. The current version of the checkpoint comprises a next operation indicator that specifies a next operation of the plurality of operations to be applied to the data. The checkpoint module is configured to store the current version of the checkpoint on the electronic device such that the current version of the checkpoint persists across reboot of the electronic device.

According to various aspects of the subject technology, a machine-readable medium encoded with executable instructions for safeguarding against interruptions when updating data of an electronic device is provided. The instructions comprise code for determining if a current operation of a plurality of operations is idempotent. The current operation is received from an update server, and the plurality of operations is associated with a current update for the data. The instructions also comprise code for applying the current operation to the data, and code for preventing termination of the applying step if the current operation is not idempotent and if the applying step has not yet completed. The instructions also comprise code for generating a current version of the checkpoint if the applying step has completed. The current version of the checkpoint comprises a next operation indicator that specifies a next operation of the plurality of operations to be applied to the data. The instructions also comprise code for storing the current version of the checkpoint on the electronic device such that the current version of the checkpoint persists across reboot of the electronic device.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

According to certain aspects of the subject technology, an approach is provided for safeguarding against interruptions when updating data of an electronic device, such as one or more files stored on the electronic device, an OS running on the electronic device, or a database stored on the electronic device. The electronic device, for example, may be a desktop computer, a laptop, a notebook, a mobile phone, a tablet, or any other suitable electronic device. In some aspects, the electronic device may correspond to a client that receives an update from a server. The update may comprise a plurality of operations, and may be downloaded from the server and applied to the data on an operation-by-operation basis. When a particular operation has been successfully applied to the data, a checkpoint may be generated and stored on the electronic device such that the checkpoint persists across reboot of the electronic device. The checkpoint may include a next operation indicator that specifies a next operation of the plurality of operations to be applied to the data. Thus, should an interruption to this update process occur, the checkpoint may be used to resume the update process by specifying which of the plurality of operations should be applied next.

In some aspects, operations can be classified as idempotent or not idempotent (i.e., non-idempotent). An idempotent operation may be an operation that can successfully be applied again if a previous attempt to apply the idempotent operation was interrupted, as if the interruption to the previous attempt never occurred. An example of an idempotent operation is an operation to write certain information onto a particular block. If this operation were to be interrupted, then the operation can simply be applied again to write the information onto the particular block. A non-idempotent operation may be an operation that cannot be successfully applied again if a previous attempt to apply the non-idempotent operation was interrupted. An example of a non-idempotent operation is an operation to swap information from a first block with information from a second block. If this operation were to be interrupted, for example, after the operation has finished writing information from the first block onto the second block but before information from the second block is written onto the first block, then this operation cannot be successfully applied again. This is because the information from the second block is lost as a result of the interruption.

According to certain aspects, an approach is provided for safeguarding against potential interruptions of non-idempotent operations. When a non-idempotent operation is being applied to the data, termination of this application process may be blocked if applying the non-idempotent operation has not yet completed. For example, shutdown requests by a user may be delayed so that applying the non-idempotent operation can be completed.

Figure 1:
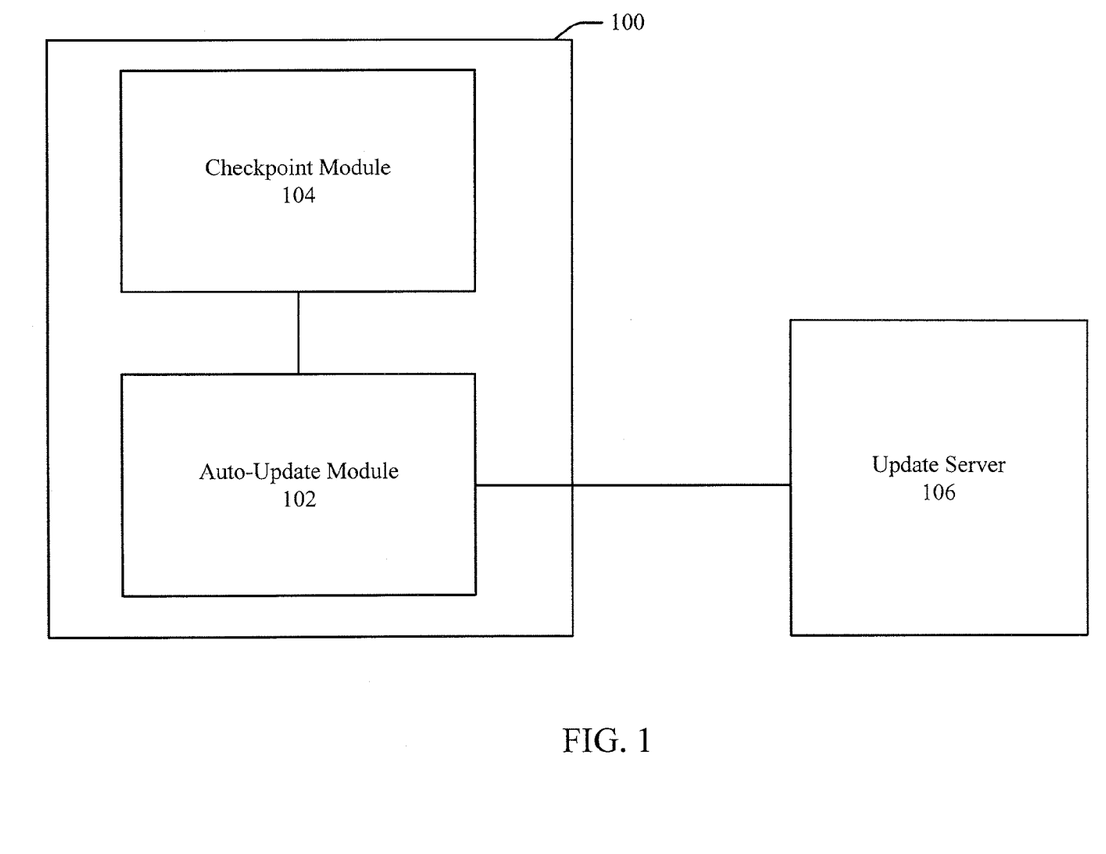
FIG. 1 illustrates an example of a system for safeguarding against interruptions when updating data of an electronic device, in accordance with various aspects of the subject technology.

FIG. 1 illustrates an example of system 100 for safeguarding against interruptions when updating data of an electronic device, in accordance with various aspects of the subject technology. System 100 may be part of the electronic device, and may be in communication with update server 106 (e.g., over a network) to receive updates to the data from update server 106. System 100 comprises auto-update module 102 and checkpoint module 104. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Although auto-update module 102 and checkpoint module 104 are shown as separate modules, auto-update module 102 and checkpoint module 104 may also be implemented as a single module. Additional features and functions of these modules according to various aspects of the subject technology are further described in the present disclosure.

Figure 2:
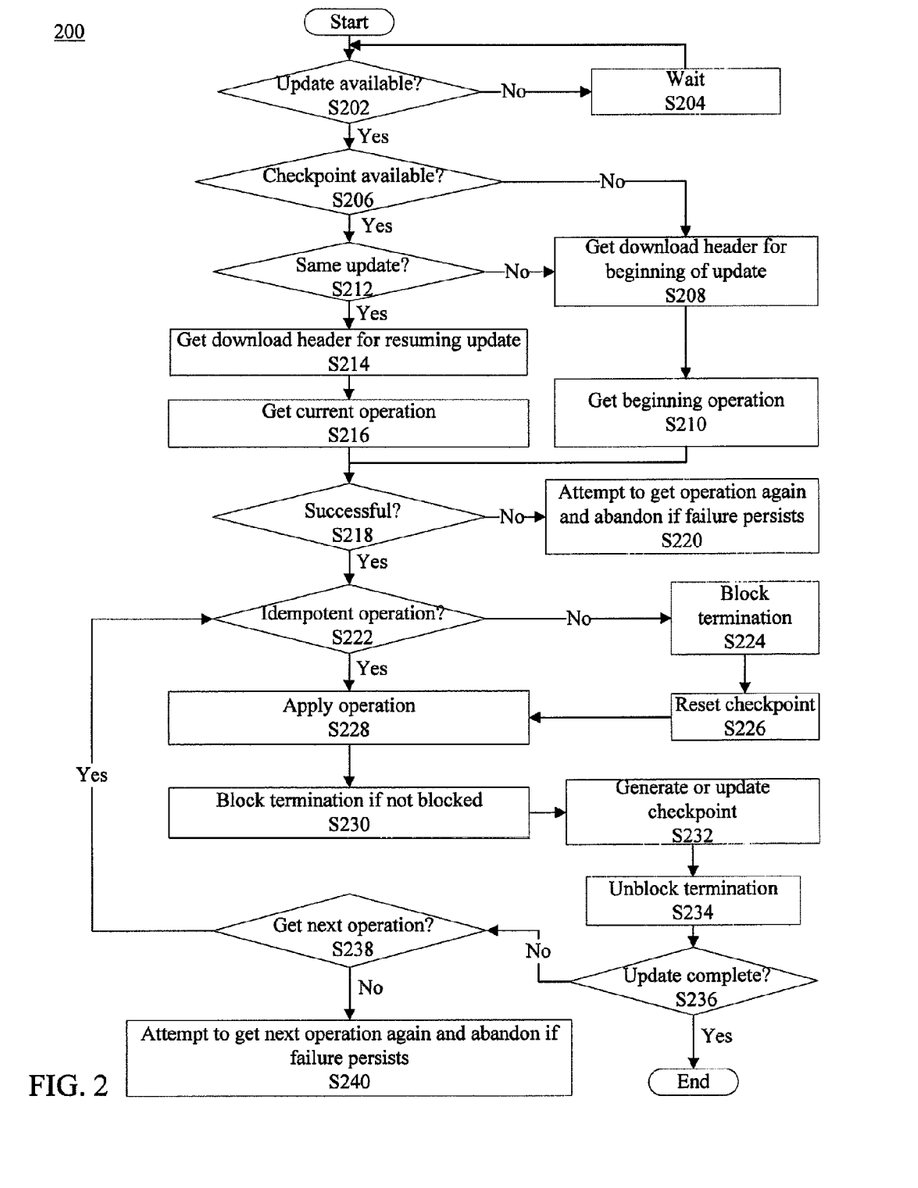
FIG. 2 illustrates an example of a method for safeguarding against interruptions when updating data of an electronic device, in accordance with various aspects of the subject technology.

FIG. 2 illustrates an example of method 200 for safeguarding against interruptions when updating data of an electronic device, in accordance with various aspects of the subject technology. According to step S202, auto-update module 102 may determine if a current update is available from update server 106. As discussed above, this update may comprise a plurality of operations that, when applied, may update the data of the electronic device. For example, the current update may comprise hundreds or even thousands of operations. However, this update may comprise a greater number or a fewer number of operations depending on the nature of the update. The operations may be received and applied one after another. Although the plurality of operations may be sequentially ordered, the plurality of operations may also be out of order. For example, an operation following a previous operation that was applied may be offset from the previous operation by a certain number of operations.

In some aspects, auto-update module 102 may determine if the current update is available from update server 106 by transmitting a request to update server 106 for the current update. Update server 106 may respond to this request by informing auto-update module 102 whether the current update is available, and if so, may provide auto-update module 102 with metadata associated with the current update. This metadata may comprise current update identification information (e.g., information to identify the specific current update to be applied to the data). For example, the current update identification information may comprise at least one of a current location of the current update, a current size of the current update, and a current expected download checksum associated with the current update.

According to step S204, if no update is available from update server 106, auto-update module 102 may wait for a predetermined duration before checking again if an update is available. On the other hand, if the current update is available from update server 106, auto-update module 102 may determine if a previous version of a checkpoint is available on the electronic device according to step S206. The previous version of the checkpoint may be stored on the electronic device from when a previous operation of a previous update was successfully applied to the data. The previous version of the checkpoint may contain information that would allow the previous update to be resumed should the update be interrupted. For example, the previous version of the checkpoint may comprise a resume operation indicator that specifies a resume operation of the plurality of operations to be applied to the data. The resume operation may be an operation following the previous operation that was successfully applied to the data before the interruption occurred. Thus, the resume operation indicator specifies which operation of the plurality of operations should be applied in order to resume the previous update.

In some aspects, the resume operation indicator also comprises previous update identification information (e.g., information to identify the specific previous update that was applied to the data prior to the interruption). For example, the previous update identification information may comprise at least one of a previous location of the previous update, a previous size of the previous update, and a previous expected download checksum associated with the previous update. The previous update identification information may be used later to determine if the current update that is available from update server 106 is indeed the same update that should be applied in order to resume the previous update.

If the previous version of the checkpoint is not available, then auto-update module 102 may receive a beginning operation of the current update or a new update. Thus, resuming of the update does not occur. According to step S208, auto-update module 102 may receive a download header for beginning an update (e.g., either the current update or the new update). This download header may provide information to access specific operations, and may comprise at least one of a list of the plurality of operations of this update, offset information of these operations, identification number information of these operations, and an expected installation checksum associated with this update. According to step S210, based on this download header, auto-update module 102 may receive a beginning operation of these operations to be applied to the data (and resuming of the update does not occur).

On the other hand, according to step S212, if the previous version of the checkpoint is available, then auto-update module 102 may compare the previous update identification information to the current update identification information to determine if the current update that is available from update server 106 is indeed the same update that should be applied in order to resume the previous update. For example, auto-update module 102 may compare the previous expected download checksum to the current expected download checksum. However, other suitable information may be used for comparison, such as the previous size of the previous update versus the current size of the current update, or the previous location of the previous update versus the current location of the current update. According to step S208, if the previous update identification information does not match the current update identification information, then auto-update module 102 may receive a download header for beginning an update, as described above. In this situation, for example, resuming of the previous update does not occur because the current update available from update server 106 is a different update from the previous update.

On the other hand, if the previous update identification information matches the current update identification information, then the current update may be considered as the same as the previous update. In this regard, according to step S214, auto-update module 102 may receive a download header for resuming the previous update. This download header may provide information to access specific operations, and may comprise at least one of a list of the plurality of operations of the current update (which is the same as the previous update), offset information of these operations, identification number information of these operations, and an expected installation checksum associated with the current update. According to step S216, based on this download header, in addition to the resume operation indicator stored on the electronic device as part of the previous version of the checkpoint, auto-update module 102 may receive a current operation of the plurality of operations to be applied to the data, wherein the current operation is the resume operation specified by the resume operation indicator.

According to step S218, auto-update module 102 may determine if receiving the operation (either from step S216 or step S210) is successful. If not, then according to step S220, auto-update module 102 may retry to receive this operation for a certain number of attempts, and abandon the effort to receive this operation if the failure to receive this operation persists. In some aspects, if auto-update module 102 abandons the effort to receive this operation, auto-update module 102 may nevertheless attempt to resume the effort to receive this operation the next time method 200 is implemented again.

According to step S222, auto-update module 102 may determine if the current operation (or the beginning operation if selected) is idempotent. According to certain aspects, a particular operation may be idempotent if the particular operation can be successfully applied again if a previous attempt to apply the particular operation was interrupted. According to step S228, auto-update module 102 may immediately apply the current operation to the data after step S222 if the current operation is idempotent. However, according to step S224, auto-update module 102 may prevent (e.g., block) termination of an attempt to apply the current operation to the data (e.g., step S228) if the current operation is not idempotent and the application of the current operation to the data is not yet complete. For example, should a user of the electronic device attempt to shutdown the electronic device while the current operation is being applied to the data, auto-update module 102 may block this shutdown by delaying the shutdown until the application of the current operation to the data is complete.

Furthermore, according to step S226, checkpoint module 104 may reset the checkpoint on the electronic device if the current operation is not idempotent. For example, checkpoint module 104 may erase the checkpoint (e.g., the previous version of the checkpoint) from the electronic device. Thus, should the current operation (which is not idempotent in this case) be interrupted, the current update is not resumed on a next attempt to apply the current update again. Rather, the beginning operation of the plurality of operations is selected to be applied to the data since the checkpoint is reset and therefore unavailable (at step S206). Note that termination of step S226 may also be prevented as a result of step S224 being implemented. According to step S228, auto-update module 102 may apply the current operation to the data after step S226.

In some aspects, according to step S230, auto-update module 102 may prevent termination of the applying step S228 if auto-update module 102 has not already prevented termination of the applying step S228. Implementing step S230 may further ensure that the applying step S228 is not interrupted, such as by the user attempting to shutdown the electronic device while the applying step S228 is occurring.

According to step S232, checkpoint module 104 may generate or update the checkpoint if the applying step S228 has completed. For example, if the checkpoint does not exist prior to step S232 (e.g., the checkpoint was reset in step S226), then checkpoint module 104 may generate the checkpoint. In particular, checkpoint module 104 may generate a current version of the checkpoint. If the checkpoint does exist prior to step S232 (e.g., the prior version of the checkpoint remains stored on the electronic device), then checkpoint module 104 may update the prior version of the checkpoint to a current version of the checkpoint. In some aspects, the current version of the checkpoint may comprise a next operation indicator that specifies a next operation of the plurality of operations to be applied to the data. In some aspects, the next operation indicator may comprise at least one of a next operation data offset, a next operation number, and the current update identification information (e.g., from the metadata received from update server 106). The next operation data offset may specify an offset to the next operation to be applied to the data, while the next operation number may specify an identification number of the next operation. Checkpoint module 104 may store the current version of the checkpoint on the electronic device such that the current version of the checkpoint persists across reboot of the electronic device. In some aspects, the current version of the checkpoint may replace the previous version of the checkpoint. Thus, should this update process be interrupted while attempting to apply the next operation, the current version of the checkpoint may provide information as to which is the next operation that should be applied to the data in order to resume the update process.

According to step S234, auto-update module 102 may cancel the preventing step (e.g., S224 and/or 5230) after storing of the current version of the checkpoint has completed. Thus, in the example where the user attempts to shutdown the electronic device while the applying step S228 is occurring, auto-update module 102 may allow the shutdown to occur by cancelling the preventing step (e.g., unblocking the termination of the applying step S228).

According to step S236, auto-update module 102 may determine if the current update is complete after the current operation has been applied to the data (e.g., if the current operation that was applied to the data is the last operation of the plurality of operations to be applied to the data as part of the current update). If so, auto-update module 102 may verify that the current update is successfully received from update server 106. For example, the current expected download checksum (e.g., from the current update identification information) may be associated with the current update and can be used to determine if the current update is successfully received from update server 106. The current expected download checksum provides an expected value as a result of successful receipt of the current update from update server 106. In some aspects, if after all of the plurality of operations have been received and/or applied to the data, auto-update module 102 may generate an actual download checksum based on the plurality of operations. If the actual download checksum matches the current expected download checksum, then it can be shown that the current update was successfully received from update server 106.

According to certain aspects, auto-update module 102 may determine an actual download checksum portion when at least one of the plurality of operations is successfully received from update server 106. The actual download checksum portion may be used to partially determine the actual download checksum while the plurality of operations are being received from update server 106. In other words, the actual download checksum portion may provide a context for calculating the actual download checksum while the plurality of operations are being received. For example, auto-update module 102 may determine/update the actual download checksum portion each time an operation of the plurality of operations is successfully received from update server 106. In some aspects, the actual download checksum portion may be updated and/or stored as part of the checkpoint at step S232. However, the actual download checksum portion is not necessarily updated each time an operation is successfully received from update server 106, but can be updated when one or more specific operations are successfully received from update server 106.

After all the plurality of operations are received, auto-update module 102 may generate the actual download checksum based on the actual download checksum portion (e.g., such as by using the final updated value of the actual download checksum portion as the actual download checksum). Auto-update module 102 may compare the actual download checksum to the current expected download checksum, and determine that the current update is successfully received from update server 106 if the actual download checksum is the same as the current expected download checksum. Otherwise, if the actual download checksum does not match the current expected download checksum, then this discrepancy may provide an indication that the current update was not successfully received from update server 106, and therefore was not successfully applied to the data.

According to certain aspects, auto-update module 102 may also keep track of the number of attempts at applying a particular operation. If auto-update module 102 determines that the number of attempts has exceeded a predetermined threshold number (e.g., three attempts or any other suitable number of attempts), then auto-update module 102 may abandon an attempt to resume the current update at the particular operation, and instead select the beginning operation to be applied to the data without resuming the current update.

According to step S238, if the current update is not yet complete, then auto-update module 102 may attempt to receive the next operation from update server 106. If auto-update module 102 is successful in receiving the next operation, then auto-update module 102 may proceed with determining whether this next operation is idempotent, according to step S222. Method 200 may continue with the process of updating the data after step S222 using the next operation. If, however, auto-update module 102 is not successful in receiving the next operation, then auto-update module 102 may retry to receive the next operation for a certain number of attempts, and abandon the effort to receive the next operation if the failure to receive the next operation persists. In some aspects, if auto-update module 102 abandons the effort to receive the next operation, auto-update module 102 may nevertheless attempt to resume the effort to receive the next operation the next time method 200 is implemented again.

Figure 3:
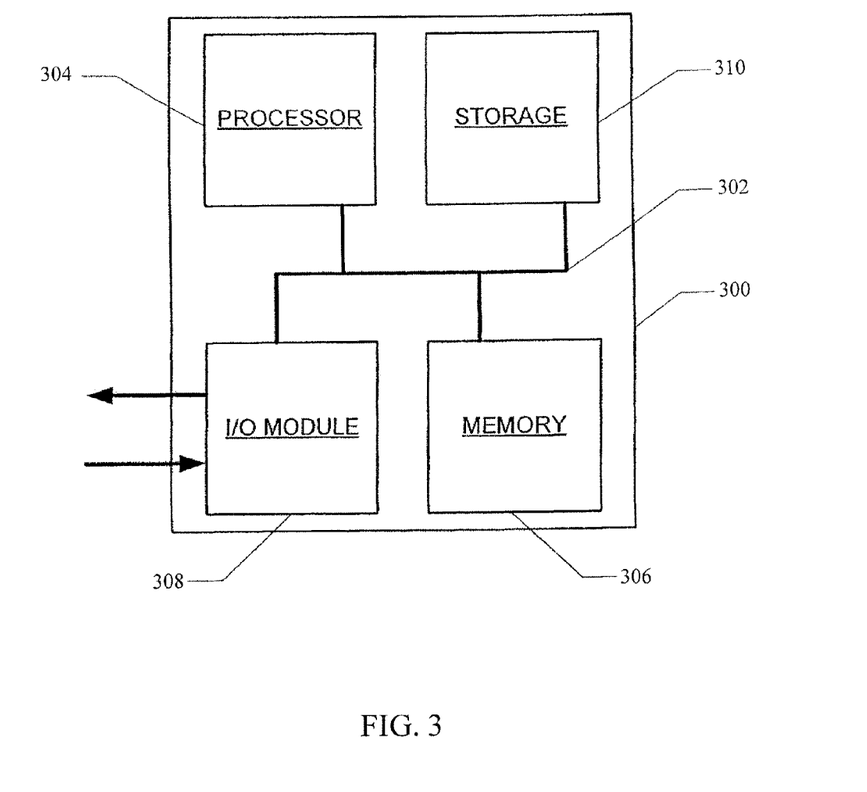
FIG. 3 is a block diagram illustrating components of a controller, in accordance with various aspects of the subject technology.

FIG. 3 is a block diagram illustrating components of controller 300, in accordance with various aspects of the subject technology. Controller 300 comprises processor module 304, storage module 310, input/output (I/O) module 308, memory module 306, and bus 302. Bus 302 may be any suitable communication mechanism for communicating information. Processor module 304, storage module 310, I/O module 308, and memory module 306 are coupled with bus 302 for communicating information between any of the modules of controller 300 and/or information between any module of controller 300 and a device external to controller 300. For example, information communicated between any of the modules of controller 300 may include instructions and/or data. In some aspects, bus 302 may be a universal serial bus. In some aspects, bus 302 may provide Ethernet connectivity.

In some aspects, processor module 304 may comprise one or more processors, where each processor may perform different functions or execute different instructions and/or processes. For example, one or more processors may execute instructions for operating system 100, one or more processors may execute instructions for safeguarding against interruptions when updating data of an electronic device (e.g., method 200), and one or more processors may execute instructions for input/output functions.

Memory module 306 may be random access memory ("RAM") or other dynamic storage devices for storing information and instructions to be executed by processor module 304. Memory module 306 may also be used for storing temporary variables or other intermediate information during execution of instructions by processor 304. In some aspects, memory module 306 may comprise battery-powered static RAM, which stores information without requiring power to maintain the stored information. Storage module 310 may be a magnetic disk or optical disk and may also store information and instructions. In some aspects, storage module 310 may comprise hard disk storage or electronic memory storage (e.g., flash memory). In some aspects, memory module 306 and storage module 310 are both a machine-readable medium.

Controller 300 is coupled via I/O module 308 to a user interface for providing information to and receiving information from an operator of system 100. For example, the user interface may be a cathode ray tube ("CRT") or LCD monitor for displaying information to an operator. The user interface may also include, for example, a keyboard or a mouse coupled to controller 300 via I/O module 308 for communicating information and command selections to processor module 304.

According to various aspects of the subject disclosure, methods described herein are executed by controller 300. Specifically, processor module 304 executes one or more sequences of instructions contained in memory module 306 and/or storage module 310. In one example, instructions may be read into memory module 306 from another machine-readable medium, such as storage module 310. In another example, instructions may be read directly into memory module 306 from I/O module 308, for example from an operator of system 100 via the user interface. Execution of the sequences of instructions contained in memory module 306 and/or storage module 310 causes processor module 304 to perform methods to safeguard against interruptions when updating data of an electronic device. For example, a computational algorithm for safeguarding against interruptions when updating data of an electronic device may be stored in memory module 306 and/or storage module 310 as one or more sequences of instructions. Information such as the plurality of operations, the metadata, the download header, the checkpoint, the current expected download checksum, the actual download checksum portion, the actual download checksum, and/or other information may be communicated from processor module 304 to memory module 306 and/or storage module 310 via bus 302 for storage. In some aspects, the information may be communicated from processor module 304, memory module 306, and/or storage module 310 to I/O module 308 via bus 302. The information may then be communicated from I/O module 308 to an operator of system 100 via the user interface.

One or more processors in a multi-processing arrangement may also be employed to execute the sequences of instructions contained in memory module 306 and/or storage module 310. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 304 for execution. Such a medium may take many forms, including, but not limited to, non-volatile media, and volatile media. Non-volatile media include, for example, optical or magnetic disks, such as storage module 310. Volatile media include dynamic memory, such as memory module 306. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A computer-implemented method for safeguarding against interruptions when updating data of an electronic device, the method comprising:
    determining if a current operation of a plurality of operations is idempotent, the plurality of operations being associated with a current update for the data and comprising at least one non-idempotent operation;
    erasing a previous version of a checkpoint if the current operation is not idempotent;
    applying the current operation to the data;
    preventing termination of the applying step and of the erasing step if the current operation is not idempotent and if the applying step has not yet completed;
    generating a current version of the checkpoint if the applying step has completed, the current version of the checkpoint comprising a next operation indicator that specifies a next operation of the plurality of operations to be applied to the data;

storing the current version of the checkpoint on the electronic device such that the current version of the checkpoint persists across reboot of the electronic device;

cancelling the preventing step after the storing step has completed; and repeating the determining, the applying, the preventing, the generating, the storing, and the cancelling for each subsequent one of the plurality of operations.

2. The method of claim 1, further comprising determining if the previous version of the checkpoint is available on the electronic device, the previous version of the checkpoint comprising a resume operation indicator.

3. The method of claim 2, wherein the resume operation indicator specifies a resume operation of the plurality of operations to be applied to the data, the resume operation being an operation following a previous operation of the plurality of operations that was successfully applied to the data.

4. The method of claim 2, further comprising receiving a beginning operation of the plurality of operations to be applied to the data if the previous version of the checkpoint is not available.

5. The method of claim 2, wherein the resume operation indicator comprises previous update identification information, and wherein the method further comprises comparing the previous update identification information to current update identification information received from an update server if the previous version of the checkpoint is available.

6. The method of claim 5, further comprising receiving a beginning operation of the plurality of operations to be applied to the data if the previous update identification information does not match the current update identification information.

7. The method of claim 5, wherein the previous update identification information comprises a previous expected download checksum associated with a previous update to the data, wherein the current update identification information comprises a current expected download checksum associated with the current update, and wherein the comparing the previous update identification information to the current update identification information comprises comparing the previous expected download checksum to the current expected download checksum.

8. The method of claim 5, further comprising receiving a download header associated with the current update if the previous update identification information matches the current update identification information, the download header comprising at least one of a list of the plurality of operations, offset information of the plurality of operations, identification number information of the plurality of operations, and an expected installation checksum associated with the current update.

9. The method of claim 1, wherein the current operation is idempotent if the current operation can be successfully applied again if a previous attempt to apply the current operation was interrupted.

10. The method of claim 1, wherein the next operation indicator comprises at least one of a next operation data offset, a next operation number, and current update identification information received from an update server, the next operation data offset specifying an offset to the next operation of the plurality of operations, the next operation number specifying an identification number of the next operation, the current update identification information comprising at least one of a current location of the current update, a current size of the current update, and a current expected download checksum associated with the current update.

11. The method of claim 1, further comprising receiving a current expected download checksum from an update server, the current expected download checksum being associated with the current update and used to determine if the current update is successfully received from the update server, the current update comprising the plurality of operations.

12. The method of claim 11, further comprising:
determining an actual download checksum portion when at least one of the plurality of operations is successfully received from the update server;
generating an actual download checksum based on the actual download checksum portion;
comparing the actual download checksum to the current expected download checksum; and
determining if the current update is successfully received from the update server based on the comparing step.

13. The method of claim 1, wherein the data comprises an operating system running on the electronic device.

14. A system for safeguarding against interruptions when updating data of an electronic device, the system comprising:
one or more processors; and
a non-transitory computer-readable medium comprising instructions stored therein, which when executed by the one or more processors, cause the one or more processors to perform operations comprising:
determining if a current operation of a plurality of operations is idempotent, the plurality of operations being associated with a current update for the data and comprising at least one non-idempotent operation;
erasing a previous version of a checkpoint if the current operation is not idempotent;
applying the current operation to the data;
preventing termination of the applying step and of the erasing step if the current operation is not idempotent and if the applying step has not yet completed;
generating a current version of the checkpoint if the applying step has completed, the current version of the checkpoint comprising a next operation indicator that specifies a next operation of the plurality of operations to be applied to the data;
storing the current version of the checkpoint on the electronic device such that the current version of the checkpoint persists across reboot of the electronic device;
cancelling the preventing step after the storing step has completed; and
repeating the determining, the applying, the preventing, the generating, the storing, and the cancelling for each subsequent one of the plurality of operations.

15. A non-transitory machine-readable medium encoded with executable instructions for safeguarding against interruptions when updating data of an electronic device, the instructions comprising code for:
determining if a current operation of a plurality of operations is idempotent, the current operation being received from an update server, the plurality of operations being associated with a current update for the data and comprising at least one non-idempotent operation;
erasing a previous version of a checkpoint if the current operation is not idempotent;
applying the current operation to the data;
preventing termination of the applying step and of the erasing step if the current operation is not idempotent and if the applying step has not yet completed;

generating a current version of the checkpoint if the applying step has completed, the current version of the checkpoint comprising a next operation indicator that specifies a next operation of the plurality of operations to be applied to the data;

storing the current version of the checkpoint on the electronic device such that the current version of the checkpoint persists across reboot of the electronic device;

cancelling the preventing step after the storing step has completed; and repeating the determining, the applying, the preventing, the generating, the storing, and the cancelling for each subsequent one of the plurality of operations.

16. The method of claim 1, further comprising receiving the plurality of operations from a server different from the electronic device, wherein the generating is performed by the electronic device.

17. The method of claim 1, wherein the at least one non-idempotent operation comprises a swap operation.

18. The method of claim 1, wherein the determining, the applying, the preventing, the generating, and the storing associated with the current operation are performed before the next operation is applied to the data.

19. The method of claim 1, wherein the repeating further comprises repeating the erasing for each subsequent one of the plurality of operations.

20. The method of claim 1, wherein the erasing comprises erasing the previous version of the checkpoint from the electronic device if the current operation is not idempotent.

21. The method of claim 1, further comprising, prior to generating the current version of the checkpoint, maintaining the previous version of the checkpoint if the current operation is idempotent.

\* \* \* \* \*